United States Patent [19]

Howes et al.

[11] 4,022,754

[45] May 10, 1977

[54] NOVEL COPOLYMER HAVING UTILITY AS CONTACT LENS

[75] Inventors: John Gordon Bernard Howes, Hertford Heath; Rupert Aleck Selway; Nicholas Mario da Costa, both of Harlow; William Duncan Potter, Puckeridge, all of England

[73] Assignee: Warner-Lambert Company, Morris Plains, N.J.

[22] Filed: Jan. 27, 1975

[21] Appl. No.: 544,065

[30] Foreign Application Priority Data

Mar. 29, 1974 United Kingdom ............. 14082/74
July 4, 1974 United Kingdom ............. 29758/74
Nov. 22, 1974 United Kingdom ............. 50813/74

[52] U.S. Cl. .................. 260/47 UA; 204/159.22; 260/29.6 R; 260/29.6 TA; 351/160; 526/264; 528/503
[51] Int. Cl.$^2$ ........................................ C08F 226/10
[58] Field of Search ...... 260/80.72, 47 UA, 89.5 R; 526/264, 16; 528/503

[56] References Cited

UNITED STATES PATENTS

| | | | |
|---|---|---|---|
| 3,532,679 | 10/1970 | Steckler | 260/80.72 |
| 3,780,003 | 12/1973 | Seymour et al. | 260/80.72 |
| 3,784,540 | 1/1974 | Kliment et al. | 260/80.72 |
| 3,792,028 | 2/1974 | Seiderman | 260/80.72 |

*Primary Examiner*—Harry Wong, Jr.

[57] ABSTRACT

Water-swellable lightly cross-linked copolymers, specifically terpolymers, between 3-methoxy-2-hydroxypropyl methacrylate (G-MEMA), at least one N-vinyl lactam and at least one copolymerizable monomer to increase strength and stiffness, have utility as contact lenses. Preferred examples contain methyl methacrylate (MMA) and vinylpyrrolidone (VP) as comonomers, and up to 5% e.g. 2% of a cross-linking agent, preferably with non-equivalent functional groups such as allyl methacrylate. Preferably the water content is up to 65% based on total gel, e.g. 50–60% by weight; the VP:MMA ratio is from 50:50 to 70:30 and from 10–75% by weight G-MEMA units are present.

23 Claims, No Drawings

NOVEL COPOLYMER HAVING UTILITY AS CONTACT LENS

This invention relates to copolymers incorporating various acrylic and methacrylic monomers, for medical or prosthetic use.

In recent years it has become desirable to produce polymeric materials for use in a physiological context and which neither deteriorate in contact with living tissue or mucous membrane or deleteriously effect this environment. Such polymers should have a known water uptake, and can be used for example in the production of contact lenses.

It is well known to make contact lenses from poly(hydroxyethyl methacrylate), otherwise known as polyHEMA. Such lenses have good strength and flexibility properties but their permeability to oxygen, and their water uptake, is rather low. This means that there is a danger of anoxia, which can cause pain and damage to the cornea.

In other polymeric materials e.g. those known copolymers, utilising VP as comonomer along with HEMA lenses of higher water content are obtained with a corresponding higher oxygen permeability. However, the strength and durability of these lenses is in some cases much diminished compared with polyHEMA.

The present invention provides an expedient for making such a water-swellable material of reproducible characteristics, the properties of which can be "tailored" depending upon the starting monomers, to optimize the various characteristics to be achieved such as modulus of elasticity (when swollen with water) flexing properties, resistance to tear propagation, light transmission, refractive index, and permeability to oxygen.

The known material

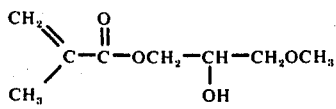

has been homopolymerised to form a cross-linked material of high water uptake of about 150% of the dry weight of polymer (i.e. about 60 – 65% of total weight of gel) which gives a swollen gel having poor mechanical properties unsuitable for example, for contact lenses.

The above compound (3-methoxy-2-hydroxy propyl methacrylate) is in effect a glycerol monoester of methacrylic acid which is further substituted on one of the hydroxy groups, referred to herein for convenience as G-MEMA. The man skilled in the art will realize that G-MEMA can contain a proportion of the isomeric 1-methoxy-3-hydroxy-isopropyl-methacrylate.

The present invention is a further development of such a polymer and consists of a lightly cross-linked hydrogel copolymer formed from at least:
1. G-MEMA
2. at least one N-vinyl lactam
3. at least one copolymerizable monomer which will increase the strength and stiffness of the swollen cross-linked N-vinyl lactam;

The copolymer being cross-linked with up to 5% by weight of a crosslinking agent whereby it is in the form of a lightly cross-linked hydrogel suitable for use as a contact lens.

It will be appreciated that the above copolymer contains 3 or more monomer units within the three categories specified, optionally with other monomer units. Preferably, such a copolymer is in the form of a terpolymer i.e. between G-MEMA, one N-vinyl lactam and one of the copolymerisable monomers of category (3).

By "terpolymer" in this context is meant a polymeric composition essentially formed from three monounsaturated components; that is to say the difunctional crosslinking agent is not to be considered as one of these three components.

Preferably, the uptake of physiological saline is up to 65% and usually from 45% to 65%, based on the total weight of gel. A preferred water uptake is from 50 to 60% by weight.

The preferred N-vinyl lactams include N-vinyl-2-pyrrolidone, N-vinyl-2-piperidone, and N-vinyl-$\epsilon$-caprolactam. The compound N-vinyl-2-pyrrolidone, hereinafter referred to as VP is preferable. Usually the copolymerizable component (3) is a monomer more hydrophobic than G-MEMA or VP. Typical examples include methyl methacrylate, 3-tert.butoxy-2-hydroxy propyl methacrylate (itself a novel compound), phenoxyethyl methacrylamide, benzyl methacrylate or phenethyl methacrylate.

As indicated above, it is particularly valuable if the N-vinyl lactam is vinyl pyrrolidone (VP). With this particular combination of monomers, it is valuable if the ratio of VP to monomer (3) by weight lies between 50:50 and 70:30. If the VP:monomer (3) ratio is less than 50:50 unduly large amounts of G-MEMA would be needed to reduce the stiffness of the terpolymer, whereas if the VP:monomer (3) ratio is greater than 70:30 the resulting terpolymer will have unduly low strength. It is preferred therefore for the ratio of VP:monomer (3) to lie between 55:45 and 65:35, and most preferred for the ratio to be 60:40 to within say 2 parts by ratio either way.

Such ratios as above may be combined in total VP-plus-monomer (3): G-MEMA ratios of from 25:75 to 90:10, i.e. from 10 to 75% by weight of G-MEMA units can be present in the terpolymer. Within this broad range from 25% to 75% by weight of G-MEMA units (i.e. 25:75 to 75:25) is preferred and from 30% to 60% by weight most preferable.

There are also identifiable types of terpolymer specifically in the "low G-MEMA" and "high G-MEMA" ranges. The former is exemplified by ranges from 10% to 40%, preferably 25% to 35% by weight of G-MEMA, and the latter by ranges from 50% to 75%, preferably 55% to 65% by weight of G-MEMA. Thus the former can be illustrated, and is exemplified below in relation to, a VP:MMA:G-MEMA polymer containing in weight percentages respectively 42:28:30 parts of monomer units, and 54:36:10, 51:34:15, and 48:32:20 weight ratios are also valuable. (MMA is methyl methacrylate). The latter can be exemplified by a 24:16:60 ratio, or as a particularly valuable example a 30:20:50 ratio.

There is of course no difficulty in carrying out the polymerisation at any of these ratios, but the eventual products have different water uptakes and physical properties depending upon the proportions of the three monomer units present.

If a triangular weight composition diagram is drawn, the above-identified compositional ranges will all fall within the sector defined between two lines, joining the 100% G-MEMA vertex with the 50:50 and 70:30 ratio respectively on the opposite side.

It is also possible, without reference to this mode of definition, to identify two useful groups of polymers formed between the weight ratios of components defined as follows:

a. 25 – 80% VP 0 – 50% "monomer (3)" 75 – 10% G-MEMA and b. 12.5 – 35% VP 7.5 – 25% "monomer (3)" 50 – 75% G-MEMA The cross-linked materials described above are formed by the addition to the monomers of a di-functional compound. The concentration of this di-functional compound or cross-linking agent is chosen according to the required degree of cross-linking. Consequently, it is determined not only by the amount of the monomers but also by their type and ability to form the cross-linked polymer. The less effective cross-linking agents have to be applied in a higher concentration than the more effective ones, and while in general up to 5% w/w of the cross-linking agent is possible it is preferred to use the more effective cross-linking agents whereby only up to 2% is preferable. Possible cross-linking agents are for instance, N,N methylenebisacrylamide, N,N-methylenebismethacrylamide, ethylene glycol dimethacrylate or polyethylene glycol dimethacrylates of general formula:

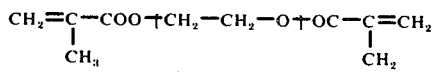

However, a particularly valuable form of cross-linking agent is a cross-linking agent where the two functional groups differ in reactivity, usually by virtue of their point of attachment to the remainder of the molecule. Particular examples of these are monoesters of acrylic or methacrylic acid with unsaturated aliphatic radicals, e.g. allyl methacrylate or 3-allyloxy-2-hydroxy propyl methacrylate, itself a novel compound mentioned in more detail below.

While the Applicants do not wish to be limited by any theory relating to the cross-linking, it seems that the provision of functional groups of different reactivities enables all three terpolymer components to be effectively linked into the main terpolymer structure with minimal formation of any non-cross-linked homopolymer, formed from the monomer with the lowest reactivity ratio at the later stages of cure. Such a homopolymer would tend to be leachable or otherwise removable from the structure leading to changes in properties and nonreproducible results.

It is moreover to be observed that the cross-linking agents of the preferred structure specified above are all hydrophobic and lack watersolubility.

Polymers according to the invention can be produced by a variety of methods, such as bulk polymerisation, solution polymerisation or possibly suspension polymerisation in non-aqueous solution. Polymerisation can be initiated by common initiators for free radical polymerisation such as various peroxides, hydroperoxides, persulphates, substituted azo compounds and the like. Initiation can also be carried out by ultraviolet light, visible light, or daylight if special initiators are used to form free radicals. Generally speaking, a very controlled isothermal polymerisation is preferred, for example carried out at from 30° to 55° C for a period of time from 4 to 24 hours, followed by a post-cure at 90° to 120° C for up to 5 hours. Under such mild conditions a polymer of reproducible properties can be obtained from the materials defined above.

While the Applicants do not intend to be limited by any hypothesis as to the action of the various monomer components in the terpolymer, it appears that the amount of VP is related to the extent of water uptake and the oxygen permeability, whereas the amount of monomer (3) such as MMA is related to the desired degree of strength and stiffness. The incorporation of G-MEMA not only relates to water uptake and oxygen permeability but also controls the mechanical properties and imparts softness without proportional reduction of strength.

While this invention is concerned with a polymer per se of the nature as described above, it is also particularly concerned with medical or prosthetic devices made from such a polymeric hydrogel, and in particular to contact lenses made from such material.

The invention will be further described with reference to the following examples which describe the preparation of copolymeric materials within the classes defined above and also describe the characteristics of these materials.

EXAMPLE 1

Terpolymer of G-MEMA, MMA and VP 60 parts by weight of vinyl pyrrolidone, and 40 parts by weight of methyl methacrylate, were mixed together and to 80 parts of the mixture were added 20 parts by weight of the methyl substituted glycerol monoester of methacrylic acid G-MEMA.

To the resulting mixture was added 0.7% by weight of a cross-linking agent, the specific member chosen being allyl methacrylate of formula

Finally, 0.25% by weight of azobisisobutyrodinitrile (AZBN) was added as a catalyst.

The mixture was put in a mould and degassed. The bulk of the reaction was carried out in a constant temperature enclosure between 45° and 55° C with the exclusion of oxygen for up to 24 hours. The mixture was heated to 110° C for 2 hours to complete the polymerisation.

The resulting polymer had a water uptake of 56.5% (based upon the total eventual hydrogel) and an oxygen permeability of about 12 units (measured as STP milliliters $\times 10^{10}$, per second, per centimeter of mercury excess pressure, through a notional one centimeter cube of material and accordingly expressed as $ml_{(STP)}/cm./cm.^2/sec/cm_{(Hg)}.10^{10}$). Moreover, the ultimate tensile strength in kilograms per square centimeter was 12.8, while the loads to 10% elongation (a measure of the stiffness of the material) was 2.4 kgf per square cm.

The above terpolymer, in the form of a cylindrical button, was lathe cut and polished by conventional methods to give a dry lens which was hydrated in a 0.9% saline solution to a soft, tough pliable contact lens.

The table shown below shows some of the properties of polymers made according to the prior art (sections I II III and IV) compared with those of polymers made according to the invention (section V). The above Example is thus tabulated in line 3 of section (V). Each of polymers V-1 to V-6 were prepared using allyl methacrylate as a crosslinking agent.

Polymers V-7 and V-8 were prepared using as crosslinking agent 0.7% by weight of polyethyleneglycol-dimethacrylate (PEGDMA) of molecular weight 340, i.e. at the same weight ratio but a different molar ratio. Similar results were obtained although a reduction in tensile properties was noted for the 30:20:50 polymer as shown in V-7 and a slight reduction for the 42:38:30 polymer as shown in V-8.

In another Example, otherwise carried out in the same fashion, using the same molar percentage of crosslinking agent as in Example 1 but wherein the crosslinking agent was the novel compound 3-allyloxy-2-hydroxypropyl methacrylate, the results obtained were as shown in V-9.

This novel material can be made in the same way as the G-MEMA itself, but using allyl glycidyl ether in place of methyl glycidyl ether.

reduces the stiffness, but gives a polymer still of good strength and oxygen permeability.

It will be observed moreover that while G-MEMA homopolymer is relatively weak, and G-MEMA:MMA copolymer is of lower oxygen permeability, the terpolymers of the present examples possess a good combination of properties over both these materials.

Section V of the table demonstrates that the VP/MMA/G-MEMA terpolymers in swollen state when compared with polyHEMA have higher water uptakes and thus higher oxygen permeabilities, higher strengths and similar flexibility making them highly suitable for soft contact lenses.

We claim:
1. A lightly cross-linked hydrogel terpolymer formed from:
   1. from 10 to 75%, by weight, of 3-methoxy-2-hydroxy propyl methacrylate;
   2. N-vinyl-2-pyrrolidone;

|   |     | VP (wt. %) | MMA (wt. %) | G-MEMA (wt. %) | $H_2O$ | $O_2$ perm. | UTS kgf/cm² | 10% T |
|---|-----|------------|-------------|----------------|--------|-------------|-------------|-------|
| I |     | 0          | 0           | 100            | 62     | 16.2 ± 2.8  | 2.6         | 0.6   |
| II|     | 0          | 22          | 78             | 28     | 2.3 ± 0.8   | 15.5        | 1.6   |
|   |     | 0          | 17          | 83             | 36     | 4.7 ± 1.5   | 9.5         | 0.8   |
|   |     | 0          | 13          | 87             | 41     | 8.7 ± 0.7   | 1.5         | 0.4   |
| III|    | 80         | 20          | 0              | 79     | 27 ± 4      | (very weak) |       |
|   |     | 70         | 30          | 0              | —      | —           | 3.7         | 1.8   |
|   |     | 60         | 40          | 0              | 58     | ≅10         | 19.2        | 8     |
| IV|     | poly(HEMA) |             |                | 36.5   | 5.3         | 6.5         | 2.5   |
| V | (1) | 54         | 36          | 10             | 57     | ≅10.5       | 18.9        | 6.4   |
|   | (2) | 51         | 34          | 15             | —      | —           | 13.8        | 3.3   |
|   | (3) | 48         | 32          | 20             | 56.5   | ≅12         | 12.8        | 2.4   |
|   | (4) | 42         | 28          | 30             | 56     | ≅9.8        | 8.4         | 1.4   |
|   | (5) | 30         | 20          | 50             | 56     | ≅10         | 8.2         | 0.5   |
|   | (6) | 24         | 16          | 60             | 55     | ≅10         | 8.4         | 0.5   |
|   | (7) | 30         | 20          | 50             | 54     | ≅10         | 4.8         | 0.55  |
|   | (8) | 42         | 28          | 30             | 55.2   | ≅10         | 7.5         | 0.9   |
|   | (9) | 30         | 20          | 50             | 52     | ≅9.3        | 4.5         | 0.48  |

In the above table water uptake was measured as uptake from physiological saline (0.9% NaCl in distilled water) at 20° C. The samples were refluxed in the saline for 16 hours and thereafter allowed to soak in fresh saline for 3 days. Percentage uptake is based on total, i.e. gel, weight.

Ultimate tensile strength (UTS) was measured by cutting out of swollen cast sheet, as described in ASTM D 1708, dumbbell-shaped samples which were then aged as above. The gauge length was 1 inch and the speed of the jaws of the Instron test machine was 2 inches per minute, the sample being immersed in saline for the duration of the test. The results are measured in Kgf/aq. cm.

The "10% I" denotes the force required for 10% elongation, and is measured from the graph obtained during the UTS test above.

Ultimate tensile strength is a measure of the strength of the material, and "10% T" an indication of its stiffness, i.e. flexibility, (the higher the force the stiffer the material). The saline uptake, and the oxygen permeability are related characteristics.

The "polyHEMA" results show an adequate strength and flexibility but low oxygen permeability. To obtain the required permeability the water uptake should preferably be about 50–60%. A copolymer between VP and MMA, between the ranges 80–60 VP: 20–40 MMA shows rapidly increasing strength but also rapidly increasing stiffness. If however such a polymer, specifically the 60:40 VP:MMA copolymer is taken, the addition to this of 10 – 30% (of the total) of G-MEMA 3. a further copolymerizable monomer selected from the group consisting of methacrylamide and methacrylate monomers which are more hydrophobic than components (1) and (2) and which will increase the strength and stiffness of the swollen cross-linked N-vinyl-2-pyrrolidone, the weight ratio of N-vinyl-2-pyrrolidone to the said further copolymerizable monomer ranging from 50:50 to 70:30;

the terpolymer being cross-linked with up to 2%, by weight, of copolymerizable crosslinking agent selected from the group consisting of methacrylyl and acrylyl crosslinking agents whereby it is in the form of a lightly cross-linked hydrogel, of water uptake up to 65% based on the total eventual weight of gel, suitable for use as a contact lens.

2. The terpolymer of claim 1 wherein the further copolymerizable monomer is a methacrylate monomer.

3. A terpolymer as claimed in claim 1 wherein the crosslinking agent is selected from the group consisting of diacrylyl and dimethacryl crosslinking agents.

4. A terpolymer as claimed in claim 2 wherein the said cross-linking agent is a cross-linking agent having two functional cross-linking groups which differ in reactivity.

5. A terpolymer as claimed in claim 2 wherein the cross-linking agent is selected from the group consisting of the unsaturated aliphatic monoesters of acrylic acid and the unsaturated aliphatic monoesters of methacrylic acid.

6. A terpolymer as claimed in claim 5 wherein the cross-linking agent is allyl methacrylate.

7. A terpolymer as claimed in claim 5 wherein the cross-linking agent is 3-allyloxy-2-hydroxy propyl methacrylate.

8. A terpolymer as claimed in claim 2 of water uptake from 50% to 60%.

9. A terpolymer as claimed in claim 1 wherein the further copolymerizable monomer (3) is selected from the group consisting of methyl methacrylate, 3-tert.-butoxy-2-hydroxy propyl methacrylate, phenoxyethyl methacrylamide, benzyl methacrylate and 2-phenylethyl methacrylate.

10. A terpolymer as claimed in claim 2 wherein the VP: monomer (3) weight ratio is from 55:45 to 65:35.

11. A terpolymer as claimed in claim 10 wherein the VP: monomer (3) weight ratio is from 58:42 to 62:38.

12. A terpolymer as claimed in claim 2 containing 25% to 75%, by weight, of component (1).

13. A terpolymer as claimed in claim 2 containing 30% to 60% of component (1).

14. A terpolymer as claimed in claim 2 containing 10% to 40% of component (1).

15. A terpolymer as claimed in claim 2 containing 25% to 35%, by weight, of component (1).

16. A terpolymer as claimed in claim 2 containing 50% to 75%, by weight, of component (1).

17. A terpolymer as claimed in claim 2 containing 55% to 65%, by weight, of component (1).

18. A lightly cross-linked hydrogel copolymer formed from (1) 10 to 75%, by weight, of 3-methoxy-2-hydroxy propyl methacrylate, (2) N-vinyl-2-pyrrolidone and (3) at least one further copolymerizable methacrylate monomer which is more hydrophobic than components (1) and (2) and which will increase the strength and stiffness of the swollen cross-linked N-vinyl-2-pyrrolidone, the weight ratio of N-vinyl-2-pyrrolidone to the said further copolymerizable methacrylate monomer ranging from 50:50 to 70:30, said copolymer being cross-linked with up to 2% of a copolymerizable crosslinking agent selected from the group consisting of methacrylyl and acrylyl crosslinking agents whereby it is in the form of a lightly cross-linked hydrogel, of water uptake up to 65% based on the total eventual weight of gel, suitable for use as a contact lens.

19. A lightly cross-linked hydrogen terpolymer between 3-methoxy-2-hydroxy propyl methacrylate, N-vinyl-2-pyrrolidone and methyl methacrylate; said terpolymer having a water uptake of 50% to 60%, by weight, based on total eventual weight of gel, a ratio of N-vinyl-2-pyrrolidone to methyl methacrylate between 58:42 and 62:38, a content of 3-methoxy-2-hydroxy propyl methacrylate units from 50% to 75%, by weight, and said terpolymer being cross-linked by up to 2%, by weight, of allyl methacrylate.

20. A contact lens made from a lightly cross-linked hydrogel terpolymer formed from:
1. from 10 to 75%, by weight, of 3-methoxy-2-hydroxy propyl methacrylate;
2. N-vinyl-2-pyrrolidone;
3. a further copolymerizable methacrylate monomer which is more hydrophobic than components (1) and (2) and which will increase the strength and stiffness of the swollen cross-linked N-vinyl-2-pyrrolidone, the weight ratio of N-vinyl-2-pyrrolidone to the said further copolymerizable methacrylate monomer ranging from 50:50 to 70:30;
the terpolymer being cross-linked with (4) up to 2%, by weight, of copolymerizable crosslinking agent selected from the group consisting of methacrylyl and acrylyl crosslinking agents whereby it is in the form of a lightly cross-linked hydrogel, of water uptake up to 65% based on the total eventual weight of gel, suitable for use as a contact lens.

21. A contact lens made from a lightly cross-linked hydrogel terpolymer between 3-methoxy-2-hydroxy propyl methacrylate, N-vinyl-2-pyrrolidone and methyl methacrylate; said terpolymer having a water uptake of 50% to 60%, by weight, based on total weight of gel, an N-vinyl-2-pyrrolidone to 3-methyl methacrylate ratio between 58:42 and 62:38, a content of 3-methoxy-2-hydroxy propyl methacrylate units from 50% to 75%, by weight, and said copolymer being cross-linked by up to 2%, by weight, of allyl methacrylate.

22. A method of producing a terpolymer comprising the following steps:
mixing together, in the presence of up to 2%, by weight, of a copolymerizable crosslinking agent selected from the group consisting of methacrylyl and acrylyl crosslinking agents;
from (1) 10 to 75%, by weight, of 3-methoxy-2-hydroxy propyl methacrylate; (2) N-vinyl-2-pyrrolidone and (3) a further copolymerizable methacrylate monomer which is more hydrophobic than components (1) and (2) and which will increase the strength and stiffness of the eventual polymer the weight ratio of N-vinyl-2-pyrrolidone to the said further copolymerizable methacrylate monomer ranging from 50:50 to 70:30;
heating the mixture at a temperature from 30° C to 55° C for a time from 4 to 24 hours to effect controlled isothermal polymerization, said polymerization being initiated in the presence of an initiator for free radical polymerization;
heating the polymer formed at from 90° C to 120° C for up to 5 hours to effect a post-cure; and
said terpolymer thereby formed as a lightly cross-linked hydrogel of water uptake up to 65% based on the total eventual weight of gel.

23. A method of producing a terpolymer comprising the following steps:
mixing together, in the presence of up to 2%, by weight, of allyl methacrylate as a crosslinking agent, 3-methoxy-2-hydroxy propyl methacrylate, N-vinyl-2-pyrrolidone, and methyl methacrylate, the ratio of N-vinyl-2-pyrrolidone to methyl methacrylate being from 58:42 to 62:38 and the 3-methoxy-2-hydroxy propyl methacrylate content being 50% to 75%, by weight;
heating the mixture at a temperature from 30° C to 55° C for a time from 4 to 24 hours to effect controlled isothermal polymerization, said polymerization being initiated in the presence of an initiator for free radical polymerization;
heating the polymer formed at from 90° C to 120° C for up to 5 hours to effect a post-cure; and
said terpolymer thereby being formed as a lightly cross-linked hydrogel with an uptake of physiological saline of up to 50% to 60% based on total eventual weight of gel.

* * * * *

UNITED STATES PATENT OFFICE
CERTIFICATE OF CORRECTION

Patent No. 4,022,754  Dated May 10, 1977

Inventor(s) John G. B. Howes et al

It is certified that error appears in the above-identified patent and that said Letters Patent are hereby corrected as shown below:

Col. 1,
    line 25, delete "corresponding" and substitute --correspondingly--.

Col. 3, line 30, delete "$-CH_2-CH_2-O-$" and insert -- $\{CH_2-CH_2-O\}$ --.

Col. 5, line 9, delete "42:38:30" and substitute --42:28:30--;
    line 52, delete "10%I" and substitute --10%T--.

Col. 7, line 47, delete "hydrogen" and insert --hydrogel--.
    (Claim 19)

Signed and Sealed this

Second Day of May 1978

[SEAL]

Attest:

RUTH C. MASON
Attesting Officer

LUTRELLE F. PARKER
Acting Commissioner of Patents and Trademarks